United States Patent
Malgorn et al.

(10) Patent No.: US 11,202,976 B2
(45) Date of Patent: Dec. 21, 2021

(54) VENTED FILTER CARTRIDGE INTEGRATED INTO THE UPPER FLANGE AND FILTRATION

(71) Applicant: CUMMINS FILTRATION SARL, Quimper (FR)

(72) Inventors: Gérard Malgorn, Quimper (FR); Stéphane Le Guyader, Briec (FR); Charles W. Hawkins, Sparta, TN (US); Terry Shults, Cookeville, TN (US)

(73) Assignee: CUMMINS FILTRATION SARL, Quimper (FR)

(*) Notice: Subject to any disclaimer, the term of this patent is extended or adjusted under 35 U.S.C. 154(b) by 191 days.

(21) Appl. No.: 16/341,701

(22) PCT Filed: Oct. 10, 2017

(86) PCT No.: PCT/EP2017/075734
§ 371 (c)(1),
(2) Date: Apr. 12, 2019

(87) PCT Pub. No.: WO2018/069272
PCT Pub. Date: Apr. 19, 2018

(65) Prior Publication Data
US 2020/0038786 A1 Feb. 6, 2020

(30) Foreign Application Priority Data
Oct. 14, 2016 (FR) ...................... 1659969

(51) Int. Cl.
*B01D 29/15* (2006.01)
*B01D 35/30* (2006.01)
*B01D 36/00* (2006.01)

(52) U.S. Cl.
CPC ............. *B01D 29/15* (2013.01); *B01D 35/30* (2013.01); *B01D 36/001* (2013.01);
(Continued)

(58) Field of Classification Search
CPC ...... B01D 29/15; B01D 35/30; B01D 36/001; B01D 2201/167; B01D 2201/291;
(Continued)

(56) References Cited

FOREIGN PATENT DOCUMENTS

DE        19835525 C1 * 10/1999 ............. F02M 37/54
DE    10 2014 002 631 A1    8/2015
(Continued)

OTHER PUBLICATIONS

International Search Report and Written Opinion issued for PCT/EP2017/075734, dated Mar. 5, 2018, 16 pages.
(Continued)

*Primary Examiner* — Waqaas Ali
(74) *Attorney, Agent, or Firm* — Foley & Lardner LLP (57) ABSTRACT

A filter cartridge (1) comprising a filter medium (2) of cylindrical shape defining a central axis (3), a first flange (4), said first flange (4) being a flange plate which comprises a central opening (5) defining a fluid outlet, a first face (4*a*) and a second face (4*b*) opposite the first face (4*a*), said face (2) being fixed to the second face (4*b*) of the first flange (4), and a filtering medium (6) extending from said first face (4*a*) along the central axis and projecting outwardly from said central opening (5), said cylindrical extension (6) having an outer face (6*a*) and an inner face (6*b*); characterized in that said cylindrical extension (6) is traversed by at least one vent (7), and in that a first joint element (8) is provided at a first position of the cylindrical extension (6) and a second sealing element (9) is provided on a second position of the cylindrical extension (6), the first joint element (8) being axially offset from the second joint member (9) with respect to the central axis so that said at least one at least one vent (7) is positioned between the first seal member (8) and the second seal member (9) with respect to the central axis (3). Filtration system incorporating such a cartridge.

12 Claims, 6 Drawing Sheets

(52) U.S. Cl.
CPC .. *B01D 2201/167* (2013.01); *B01D 2201/291* (2013.01); *B01D 2201/342* (2013.01); *B01D 2201/347* (2013.01)

(58) Field of Classification Search
CPC ........ B01D 2201/342; B01D 2201/347; B01D 29/21; B01D 29/58
See application file for complete search history.

(56) References Cited

FOREIGN PATENT DOCUMENTS

| | | | | |
|---|---|---|---|---|
| FR | 2822395 | B1 | 1/2004 | |
| FR | 2890703 | A1 | 3/2007 | |
| FR | 2890703 | B1 * | 3/2013 | ............. F02M 37/54 |
| WO | WO 2007/010037 | | 1/2007 | |

OTHER PUBLICATIONS

Search Report and Written Opinion issued for French Patent Application No. FR1659965, dated Oct. 14, 2016, 6 pages.

* cited by examiner

VENTED FILTER CARTRIDGE INTEGRATED INTO THE UPPER FLANGE AND FILTRATION

CROSS REFERENCE TO RELATED APPLICATIONS

The present application is a national stage of PCT Application No. PCT/EP2017/075734, filed Oct. 10 2017 which claims priority to French Patent Application No, 1659969, entitled "Vented Filter Cartridge Integrated into the Upper Flange and Filtration" and filed Oct. 14, 2016. The contents of both applications are incorporated herein by reference in their entirety.

FIELD OF THE INVENTION

The present invention relates to the field of design and construction of filtering systems used for filtering liquids circulating in hydraulic motors or equipment.

PRIOR ART

Such filtering systems consist of a filter body with a filter cartridge inside, which generally have a cylindrical shape consisting of a filtration medium that, for example, can be made of paper, cardboard, or even felt. This filtration medium is normally coupled with two terminal flanges.

Such filter cartridges generally integrate a central tube that is coupled or not with flanges whose external diameter is close to the internal diameter of the filtration medium such that deformations of the filtration medium under the effect of the pressure in the interior of the filtering system are limited.

The lower flanges can be equipped with means for installing and maintaining the cartridge inside the filtering system.

The components of the filtering system can also consist of a support tube onto which the filter cartridge can be fitted by pressing, such that the tube fixedly mounted within the filtering system.

In this second specific case, in particular, filtration assemblies are known, which implement a support tube including a vent intended to ensure the degassing of the filtering system, in particular at the moment when it is filled with liquid.

In such support tubes, which are fixedly mounted in the filtering system, either erosion or clogging of the vent takes place over the long term, which, in both cases, gradually diminishes the performance of the filtering system.

As a matter of fact, when the vent is eroded, the permanent leak of unfiltered liquid that returns to the tank containing the liquid increases, and this then leads to a decrease in the quantity of the liquid that is available for filtering and a waste of energy.

In the case of vent clogging, the degassing of the filtering system becomes increasingly difficult to ensure, which leads to a decreasing liquid level, or even increasing pressure inside the filtering system, at the expense of the lifespan of the filter cartridge and even, in the long term, the quality of filtration.

In the case of established failure (which could lead to relatively adverse consequences for the motor or the hydraulic equipment), tube replacement could definitely be considered. Generally, this operation is not expected, and if such were the case, it would require specific upkeep that could lead to extra costs and produce new waste that must be eliminated.

In order to remedy this problem, a filter cartridge was proposed consisting of a filtration medium displaying an internal tubular light, with this filtration medium being defined by an upper flange and a lower flange characterized in that said upper flange displays a vent adjoining said tubular filtration medium. According to this technique, described in FR 2822395A, the vent permitting the degassing is therefore integrated in the filter cartridge and is not an integral part of a mechanism remaining in the filtering system or needing specific maintenance. On the other hand, at each replacement of the filter cartridge (operation that is generally planned depending on the number of hours of use or the kilometers traveled in the case of a vehicle), a new vent is put into operation, thus ensuring the optimal functioning of the degassing methods. The effects of the erosion and/or the clogging are therefore eliminated or at least limited at the level of the vent.

Although it is very satisfactory, this technique cannot be put into operation efficiently with certain next-generation filtrating media, which are synthetic and are essentially air-impermeable. In particular, such media can be selected among the polyamides, polyethylenes, polyethersulfones.

OBJECTS OF THE INVENTION

The aim of the invention is to offer a filter cartridge equipped with a vent intended to guarantee the degassing of the filtering system equipped with it, even in the case where its filtration medium is essentially air-impermeable.

Another aim of the invention is to propose such a filter cartridge that is equipped with such a vent that can be manufactured easily in large sets.

Another aim of the invention is to reveal a filtering system integrating such a cartridge, which does not cause, or at the very least limits, the phenomena of erosion or clogging of the degassing means.

Another aim of the invention is to propose such a filtering system that does not need additional maintenance with respect to the previous design solutions.

Another aim of the invention is to propose such a filtering system whose degassing methods limit the leaking of non-filtered liquid.

Another aim of the invention is to propose such a filtering system that does not need additional maintenance with respect to the previous design solutions.

One implementation relates to a filter cartridge including a filter medium and a flange. The flange has a first side interfacing with the filter medium and a second side opposite the first side. The flange includes a cylindrical extension extending from the second side. The cylindrical extension includes a vent configured to facilitate passage of air therethrough.

Another implementation relates to a filter cartridge including a filter medium, a flange, and a member. The flange has a first side that interfaces with the filter medium and a second side opposite the first side. The flange includes a first cylindrical wall and a second cylindrical wall. The first cylindrical wall extends from the second side. The second cylindrical wall extends from the second side. The member is positioned between the first cylindrical wall and the second cylindrical wall. The member is configured to selectively move with respect to the flange.

Another implementation relates to a filtration system including a filter medium, a filtration head, a first flange, and a valve assembly. The filtration head includes an aperture communicable with an air purge. The first flange has a first side that interfaces with the filter medium and a second side opposite the first side and that is adjacent the filtration head. The first flange includes a first cylindrical wall and a second cylindrical wall. The first cylindrical wall extends from the second side towards the filtration head. The second cylindrical wall extends from the second side towards the filtration head. The valve assembly is movable between a first position, where air may pass from between the filtration head and the first flange through the aperture to the air purge, and a second position, where air may not pass from between the filtration head and the first flange through the aperture to the air purge. The valve assembly includes a first member positioned within the aperture. The first member is configured to move with respect to the filtration head in response to accumulation of fluid between the filtration head and the first flange.

It should be noted that according to one embodiment of the invention, said first sealed component and the second sealed component can form only one piece that will be provided with one air passage opening adjoining said vent.

DESCRIPTION OF THE INVENTION

These aims are reached, entirely or partially, thanks to the invention that relates to a filter cartridge consisting of:
a filtration medium with a cylindrical form defining a central axis; a first flange, said first flange being a flange that is open and consisting of:
  a central opening defining an exit of the filtered fluid;
  a first side and a second side opposite the first side, with said filtration medium being attached to the second side of the first flange;
  a cylindrical extension extending itself from said first side according to the central axis and making a protrusion towards the exterior of said central opening, the said cylindrical extension displaying an external side and an internal side;
  characterized in that said cylindrical extension is traversed by at least one vent,
  and that a first sealed component is provided on a first position of the cylindrical extension and a second sealed component is provided on a second position of the cylindrical extension, with the first sealed component being axially offset from the second sealed component with respect to the central axis in such a way that said has at least one vent positioned between the first sealed component and the second sealed component with respect to the central axis.

Such a filter cartridge is intended to be integrated in a filtering system that will be described below.

According to the invention, the vent is not an integral part of a mechanism remaining in the filtering system or needing specific maintenance. On the other hand, at each replacement of the filter cartridge (operation that is generally planned depending on the number of hours of use or the kilometers traveled in the case of a vehicle), a new vent is put into operation, thus ensuring the optimal degassing. The effects of the erosion and/or the clogging of the vent are thus eliminated or at least limited.

It should be noted that the cylindrical extension of the cartridge according to the invention can form only one element with said upper flange or be constituted by one piece applied and attached to it.

According to one embodiment of the invention, said first sealed component and the second sealed component are selected among the applied components and the overmolded components.

According to one embodiment, said first sealed component is a gasket. Also according to one embodiment, it is positioned in support on the first side of the first flange and on the internal wall of said cylindrical extension.

According to one embodiment, said second sealed component is a gasket. For example, it is inserted in a stop extending said cylindrical extension.

The vent displays an air inlet and an air outlet, said air inlet located on the outside wall of said cylindrical component and said air outlet located on the internal wall of said cylindrical component. Preferably, the diameter of the air outlet is smaller than the diameter of the air inlet. In this way, the upper flange of the cartridge that includes the vent can be easily manufactured by molding and with precision. However, other manufacturing techniques can be adapted.

Advantageously, the diameter of the air outlet is between 0.1 mm and 0.4 mm.

And finally, the medium filtrating the cartridge according to the invention is preferably essentially air-impermeable.

The invention relates also to a filtering system consisting of:
  a filtration head consisting of a fluid inlet, a fluid outlet, and an air venting feature;
  a cylindrical housing extending said filtration head; and
  a filter cartridge according to the invention, such as described above;
  characterized in that said first component of the filter cartridge is in airtight contact with a first portion of the filtration head and the second component of the filter cartridge is in airtight contact with a second portion of the filtration head, thus insulating a clean side of the filter cartridge that adjoins the fluid outlet of a dirty side of the filter cartridge, which is in communication with the fluid inlet and
  characterized in that the first flange and the filtration head define an air purge compartment adjoining said air purge, with the first sealed component insulating the air purge compartment on the clean side and the second sealed component essentially insulating the air purge compartment on the dirty side, said vent connecting the air purge compartment with the dirty side.

According to one embodiment, the cylindrical housing can form only a single piece with the filtration head.

According to another embodiment, the cylindrical housing will cooperate in a detachable manner with this filtration head.

LISTS OF FIGURES

The invention, as well as the different advantages displayed by it, will be included more easily thanks to the description that will follow a method of its creation that is given as an example and is non-exhaustive in reference to the figures in which.

DESCRIPTION OF AN EMBODIMENT

Description of the Filter Cartridge

Figure 1:
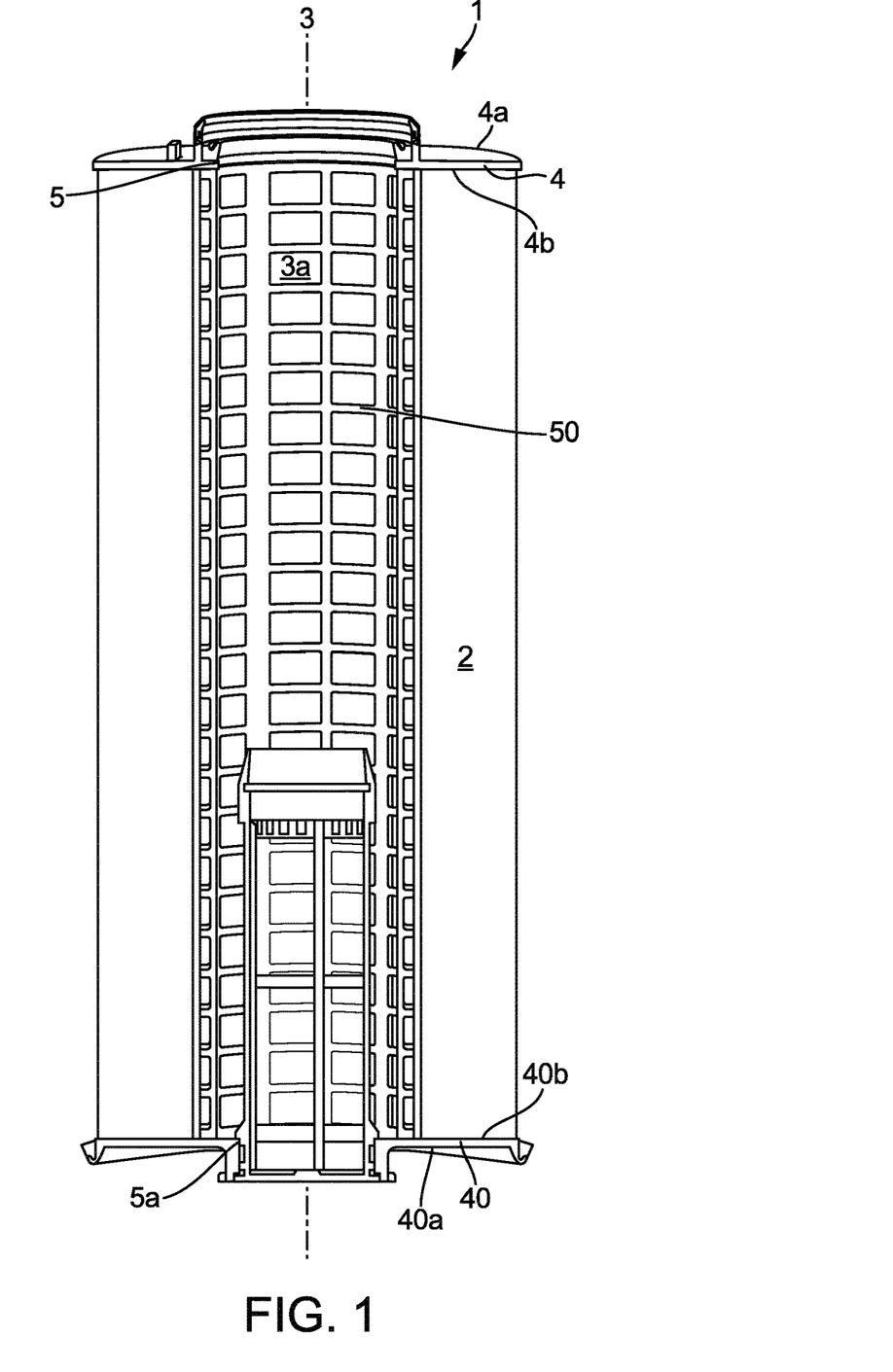
FIG. 1 depicts a cross-sectional view of a filter cartridge according to the current invention.

In reference to FIG. 1, filter cartridge 1 according to the invention consists of a filtration medium 2 in a cylindrical form defining a cylindrical light 3a along a central axis 3. Within the framework of the current implementation method, this medium is in (to be completed). This device is essentially air-impermeable.

This filtration medium 2 is attached at each of its ends to a flange in rigid plastic material displaying a coaxial opening to the light of filtration medium 2.

More precisely, a flange, known as first flange 4 displaying opening 5, is provided in the upper part of filter cartridge 1, and another flange, known as second flange 40 displaying opening 5a, is provided in its lower part.

The first flange 4 displays a first side 4a and a second side 4b. The filtration medium is attached to the second side 4b of this first flange 4. The second flange 40 displays a first side 40a and a second side 40b. The filtration medium is attached to the second side 40b of this first flange 40.

A tubular element 50, consisting of a mesh in plastic material, connects flanges 4 and 40 between them and ensures the rigidity of filter cartridge 1.

Figure 2:
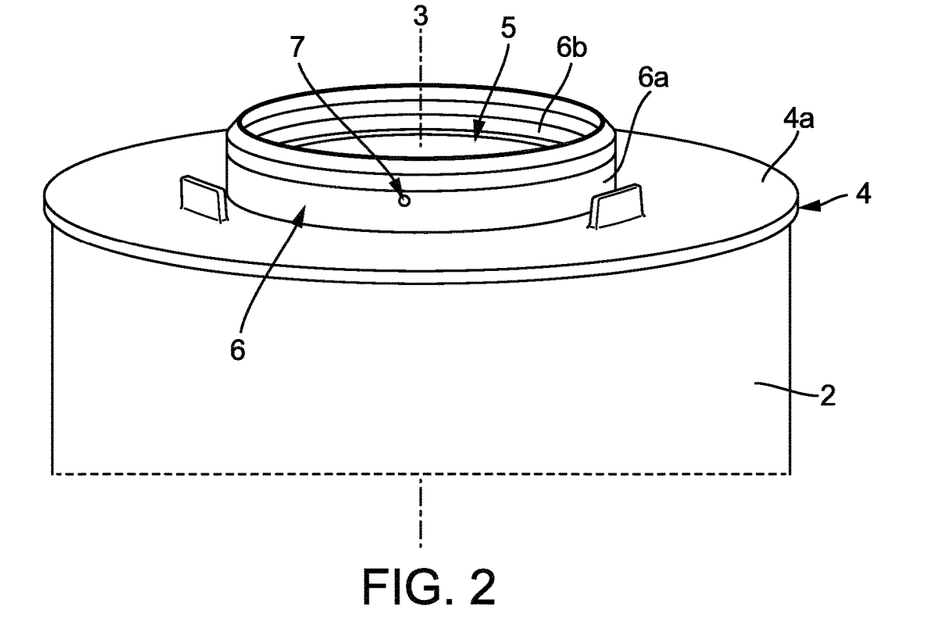
FIG. 2 depicts a view in perspective of the upper part of the filter cartridge depicted in FIG. 1.

As it can be seen more precisely in FIG. 2, the first flange 4 displays a cylindrical extension 6 that is extending from the first face 4a along central axis 3 and making a protrusion towards the exterior of said central opening 5. This cylindrical extension 6 displays an external side 6a and an internal side 6b and it is, according to the current invention, provided with vent 7 traversing it, said vent consisting of a channel leading to one of its ends of the external side 6a and to the other of its ends on the internal side 6 b of cylindrical extension 6.

Figure 3:
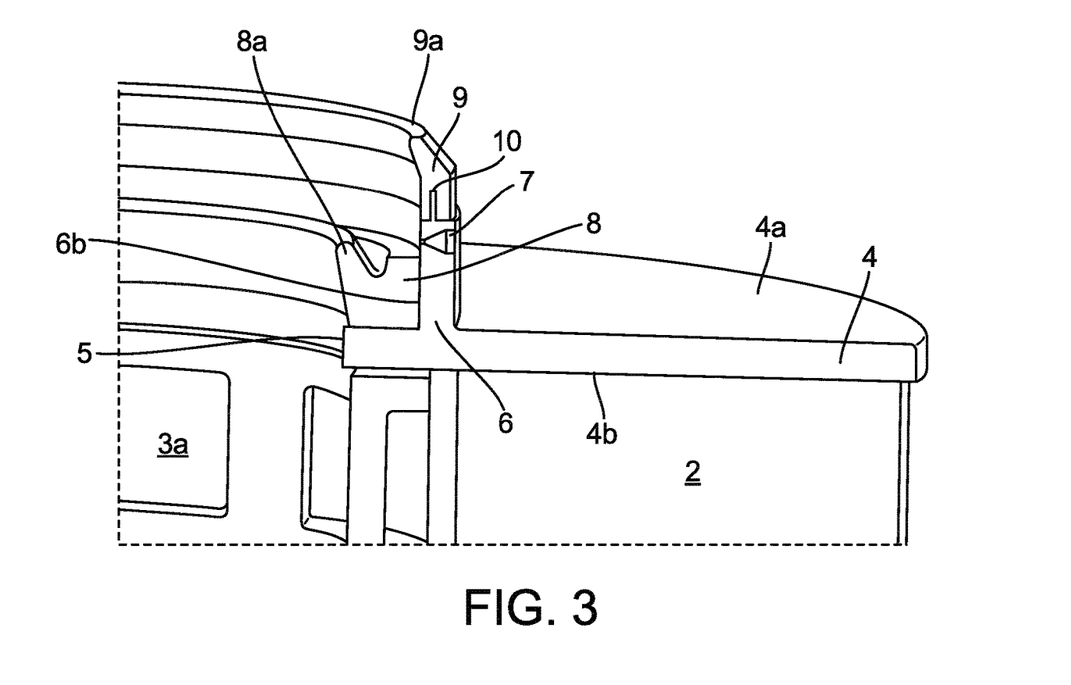
FIG. 3 depicts a cross-sectional view of a portion of the upper part of the cartridge depicted according to FIG. 2.

In reference to FIG. 3, a first seal 8 is provided in a first position of cylindrical extension 6, and a second seal 9 is provided in a second position of cylindrical extension 6. According to the invention, the first seal 8 is axially offset from the second seal 9 with respect to axis 3. Thus, vent 7 is positioned between the first seal 8 and the second seal 9 with respect to central axis 3.

The first seal 8 is a circular seal in nitrile positioned as a support on the first side 4a of the first flange 4 and on the internal wall 6b of cylindrical extension 6. It displays a gasket 8a.

The second seal 9 is a circular seal in nitrile inserted on a stop 10 extended towards said high cylindrical extension 6. It displays a gasket 9a.

(It should be noted that in other implementation modes, seals 8 and 9 can be carried out in materials other than the nitrile, namely in hydrogenated nitrile, Viton® FKM or thermoplastic elastomer, vulcanized thermoplastic, or polyurethane thermoplastic).

As it can be seen also in FIG. 3, vent 7 is extended radially with respect to axis 3. Furthermore, it displays an air inlet and an air outlet. The air inlet is located on the external wall 6a of the cylindrical element while the air outlet 6b is located on its internal wall 6b. The diameter of the air outlet of the vent is smaller than the diameter of the air inlet.

Within the framework of the current method of implementation, the diameter of the air outlet is 0.2 mm.

Description of the Filtration System

Figure 4:
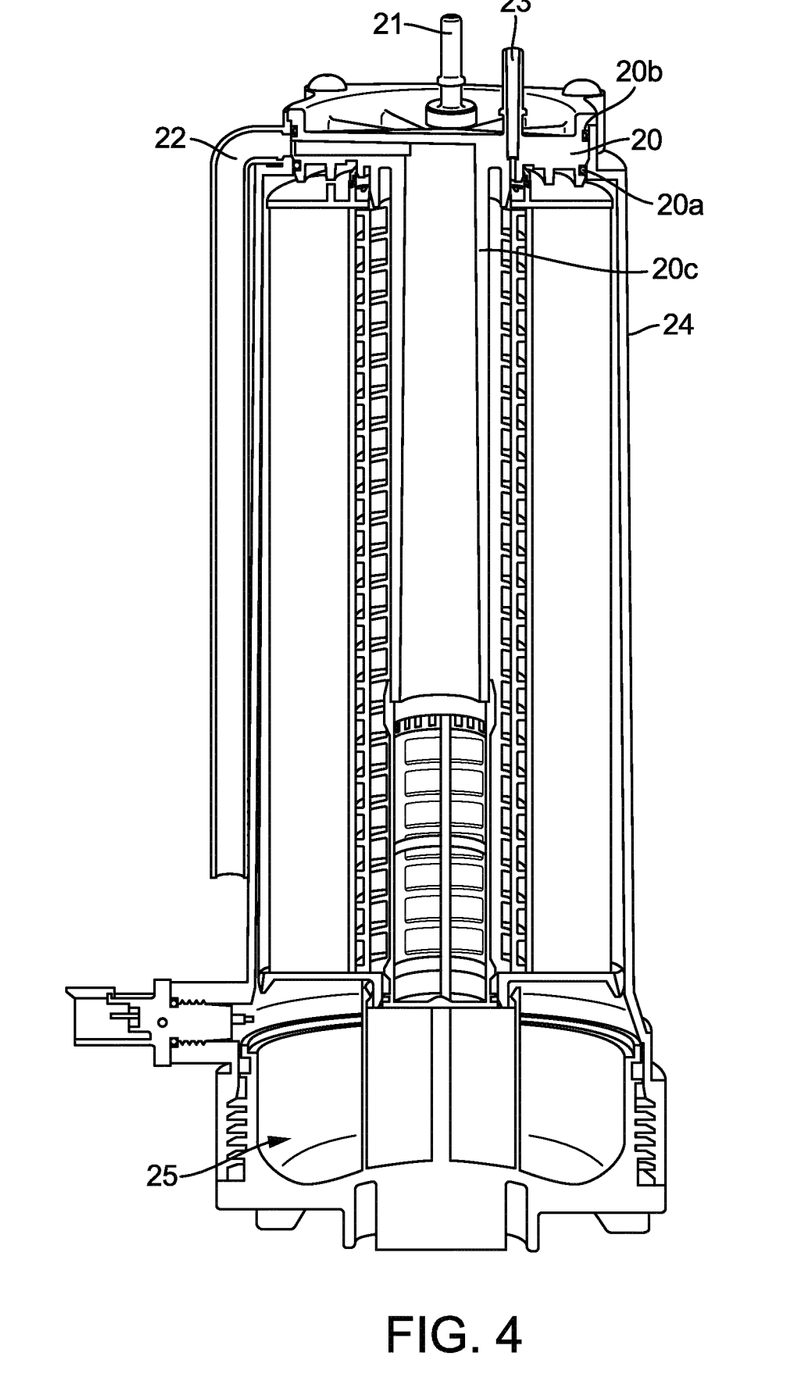
FIG. 4 depicts a cross-sectional view of a filtration assembly according to the invention accommodating a filter cartridge according to FIGS. 1 to 3.

In reference to FIG. 4, the filtering system according to the invention consists of filtration head 20 equipped with an inlet 21 of the fluid to be filtered and an outlet 22 of the filtered fluid. This filtration head 20 is also provided with an air purge 23 including a vertical conduit connected to the container of the liquid to be filtered (not shown).

The filtration head 20 works together with a cylindrical housing 24 operating in detachable manner together with said filtration head 20. Seals 20a and 20b guarantee airtightness between filtration head 20 and cylindrical housing 24. (It should be noted that in other methods of implementation the cylindrical housing can form only one single piece with the filtration head 20).

The cylindrical housing 24 is mounted by means of a screw-on fixture on a cover 25 equipped with a drainage system (not shown).

Furthermore, the system consists of a filter cartridge 1 such as the one described in the reference to FIGS. 1 to 3 below, which is press-fitted onto a tubular component 20 c of the filtration head.

Figure 5:
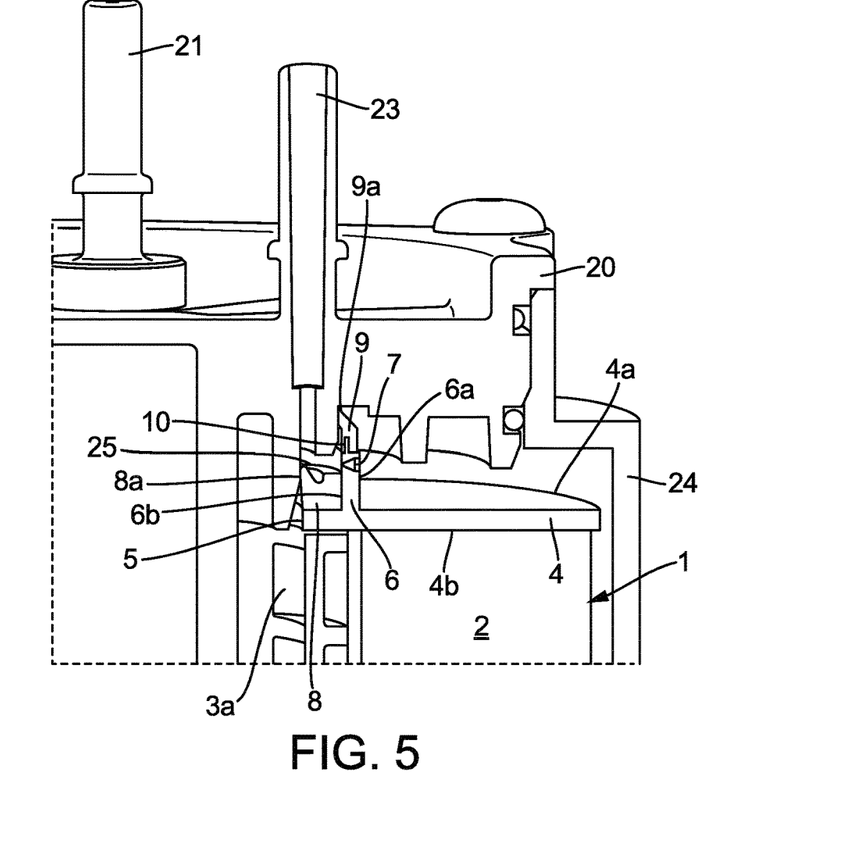
FIG. 5 depicts a cross-sectional view of a portion of the upper part of the filtration assembly depicted in FIG. 4.

In reference to FIG. 5, the first seal 8 of the filter cartridge 1 is in airtight contact, thanks to its gasket 8a, with a first portion of the filtration head 20, and the second seal 9 of filter cartridge 1 is in airtight contact, thanks to its gasket 9a, with a second portion of filtration head 20. Therefore, the clean side of filter cartridge 1, which is adjoining the fluid outlet, is insulated from the dirty side of filter cartridge 1 which is adjoining fluid inlet 21. The "dirty side" of the cartridge is understood to mean the side of the cartridge that receives the fluid to be filtered and by the "clean side" of the cartridge, it is the side of the cartridge that receives the filtered fluid.

According to this implementation, the first flange 4 and the filtration head 20 define a compartment of circular air purge 25 adjoining the duct of the purge of the air passing from a tank (not shown) into the atmosphere. The first seal 8 insulates this air purge compartment 25 on the clean side and the second seal 9 essentially insulates this air purge compartment 25 on the dirty side, with only vent 7 allowing said air purge compartment 25 to be adjoined on the dirty side of the filter cartridge.

Description of the Operation of the Filtration System

During operation, the fluid to be filtered arrives under pressure in the system through fluid inlet 21 and penetrates in the peripheral space managed between filter cartridge 1 and the internal wall of cylindrical housing 24 in order to be filtered by passing through filtration medium 2.

The filtered fluid is recovered in cylindrical light 3a of filter cartridge 1 and is evacuated from the system through outlet 22 of the filtered fluid.

Since the filtration medium is essentially airtight, the air that is eventually present in the fluid to be filtered cannot cross it. This air goes up and passes through the vent communicating with circular compartment 25, which is airtight, thanks to seals 8 and 9, in order to be evacuated through air purge duct 23 to the tank for the liquid to be filtered that is in the atmosphere.

Description of Various Embodiments of the Filter Cartridge

In some embodiments, the filter cartridge 1 includes a valve positioned within the vent 7 such that any air passing from the compartment 25, through the vent 7, to the dirty side of the filter cartridge 1 is passed, or selectively passed, through the valve. This valve may be, for example, a button valve, an umbrella valve, a breather fitting (e.g., a stone breather fitting, a sintered bronze breather fitting, breather vent, air vent zerk fitting, etc.), or divots in the filter cartridge 1 itself.

Figure 6:
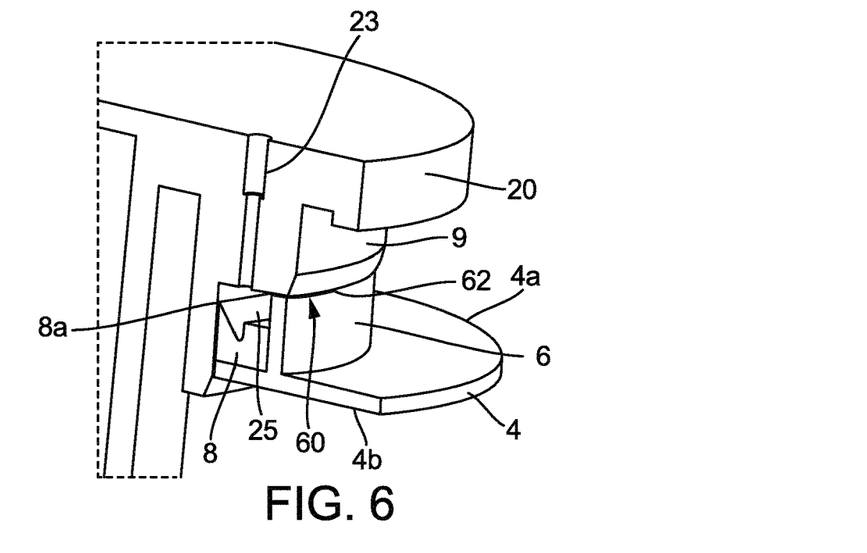
FIG. 6 is a cross-sectional view of a portion of a filter cartridge according to another example embodiment.
Figure 7:
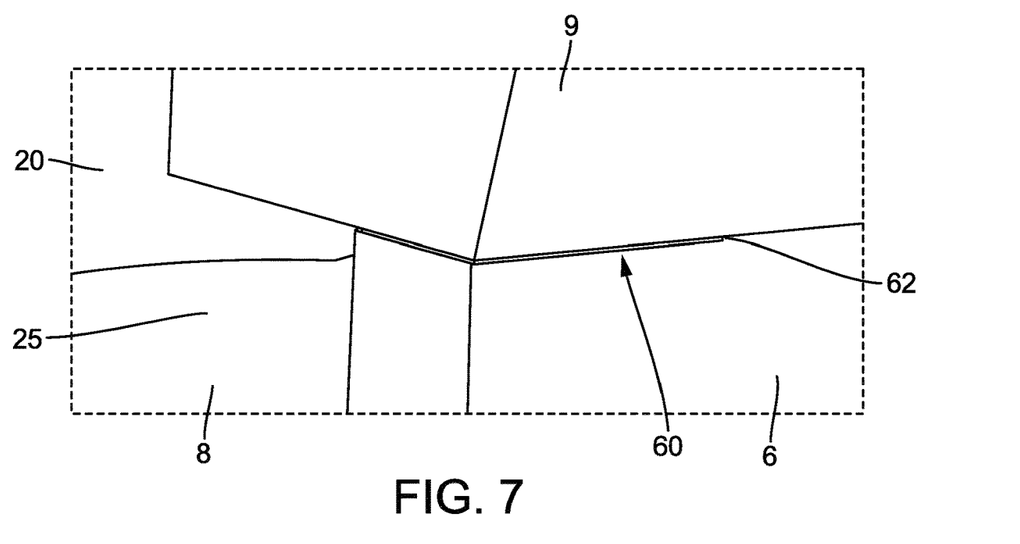
FIG. 7 is a detailed view of the filter cartridge shown in FIG. 6.

An embodiment of the filter cartridge 1 previously described where the vent 7 is replaced with an elongated vent 60 (e.g., air vent, etc.) is shown in FIGS. 6 and 7. While the elongated vent 60 may be formed in any combination of the second seal 9 and the cylindrical extension 6 of the first flange 4, the elongated vent 60 is shown as being formed in the cylindrical extension 6. The elongated vent 60 defines a gap between the cylindrical extension 6 of the first flange 4 and the second seal 9 such that air may flow from between the first flange 4 and the filtration head 20, through the elongated vent 60, into the compartment 25, and to the tank through the air purge 23. The elongated vent 60 is defined along an end face 62 of the cylindrical extension 6 such that the elongated vent 60 is inset into the end face 62. The end face 62 is a surface of the cylindrical extension 6 that is opposite the first face 4a. In some embodiments, the end face 62 may be disposed along a plane that is parallel a plane upon which the first face 4a is disposed.

The gap defined by the elongated vent 60 has a volume that is related to a circumferential length (e.g., along the circumference of the cylindrical extension 6, etc.) of the elongated vent 60 and an axial height (e.g., as measured along an axis parallel to the central axis 3. As the volume of the gap defined by the elongated vent 60 increases, the amount of air that may pass through the elongated vent 60 similarly increases. Similarly, as the volume of the gap defined by the elongated vent 60 decreases, the amount of air that may pass through the elongated vent 60 similarly decreases. While the filter cartridge 1 is only shown as including one of the elongated vents 60, it is understood that the filter cartridge 1 may include two, three, four, or more of the elongated vents 60. In these embodiments, the multiple elongated vents 60 may be spaced equidistantly about the circumference of the cylindrical extension 6.

Figure 8:
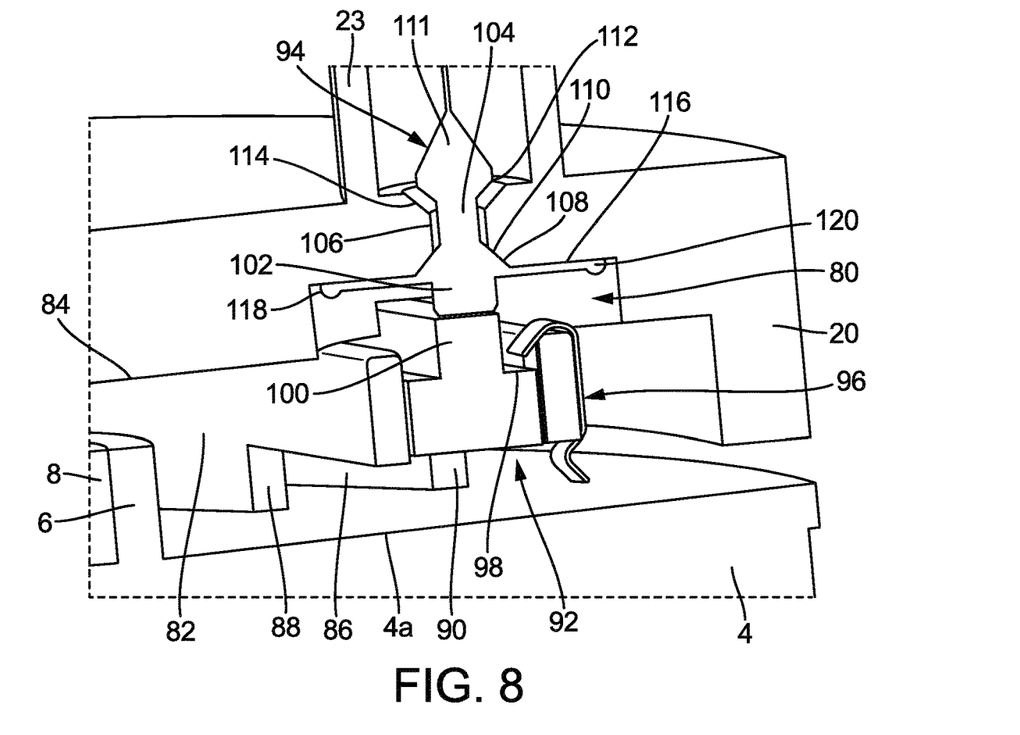
FIG. 8 is a cross-sectional view of a portion of a filter cartridge according to yet another example embodiment.
Figure 9:
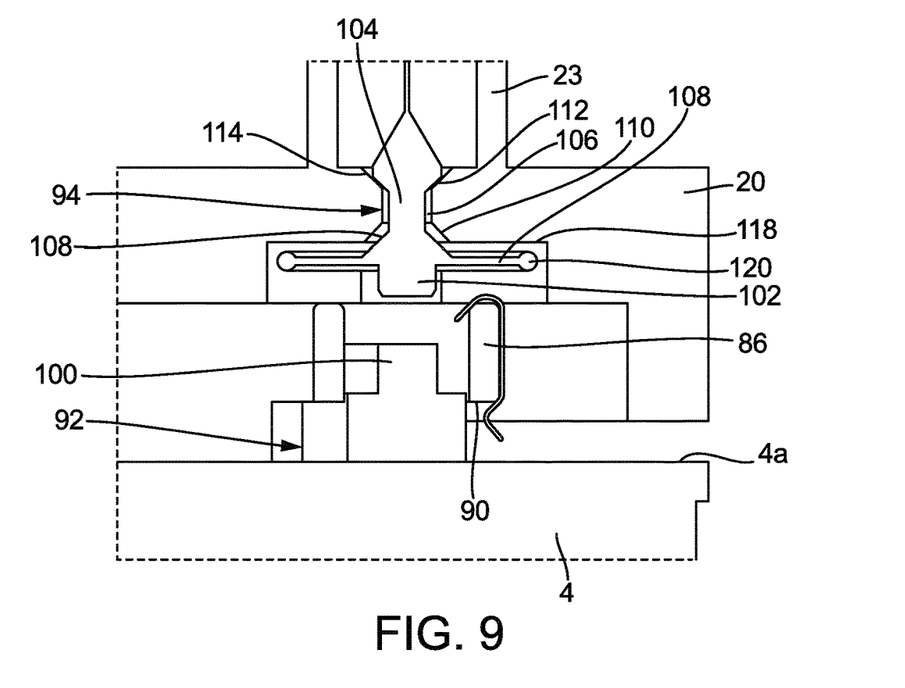
FIG. 9 is a detailed view of the filter cartridge shown in FIG. 8.
Figure 10:
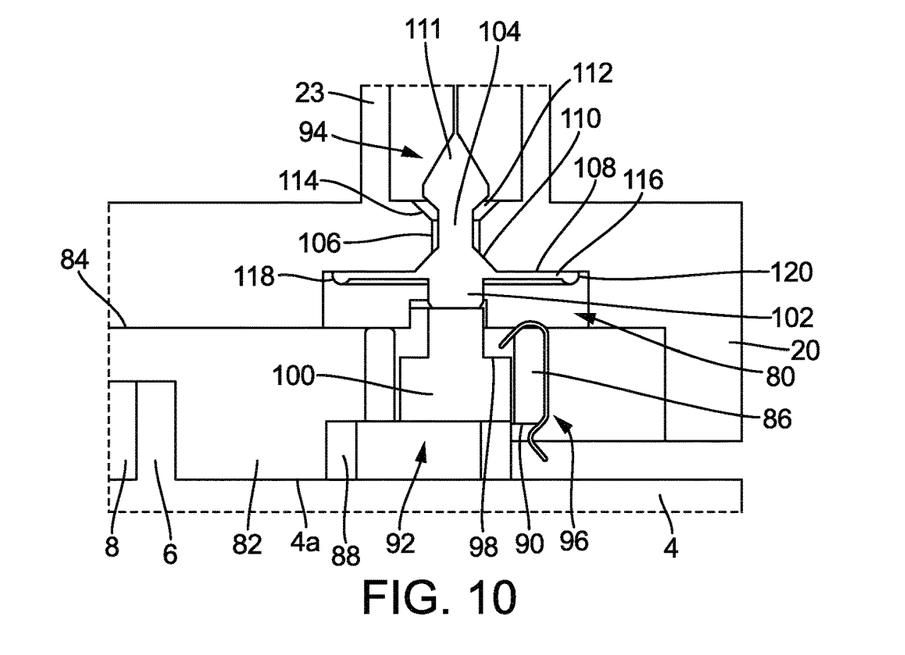
FIG. 10 is another detailed view of the filter cartridge shown in FIG. 8.

An embodiment of the filter cartridge 1 previously described where the vent 7 is replaced with a valve assembly 80 is shown in FIGS. 8-10. The valve assembly 80 controls the flow of air from between the first flange 4 and the filtration head 20, through the valve assembly 80, and to the tank through the air purge 23.

The first flange 4 includes a first cylindrical wall 82 (e.g., extension, protrusion, protuberance, projection, etc.) extending from the first face 4a of the first flange 4 such that the first cylindrical wall 82 contacts a first face 84 of the filtration head 20. The first flange 4 also includes a second cylindrical wall 86 extending from the first face 4a of the first flange 4 such that the first cylindrical wall 82 contacts the first face 84 of the filtration head 20. The first cylindrical wall 82 is disposed closer to the central axis 3 than the second cylindrical wall 86, such that the second cylindrical wall 86 is radially offset from the first cylindrical wall 82 forming a gap therebetween. The first cylindrical wall 82 defines an opening 88 positioned along the first face 4a of the first flange 4. Similarly, the second cylindrical wall 86 defines an opening 90 along the first face 4a of the first flange 4. The opening 88 is aligned with the opening 90. In operation, air flows from between the second cylindrical wall 86 and the filtration head 20, through the opening 90, into the gap between the first cylindrical wall 82 and the second cylindrical wall 86, through the opening 88, and to the tank through the air purge 23.

The valve assembly 80 includes a biasing member 92 (e.g., float, etc.) positioned between the first cylindrical wall 82 and the second cylindrical wall 86 and between the first face 4a of the first flange 4 and a valve member 94 (e.g., diaphragm valve, etc.). The biasing member 92 translates (e.g., slides, moves, etc.) along an axis parallel to the central axis 3 between the first cylindrical wall 82 and the second cylindrical wall 86. Translation of the biasing member 92 is limited by a retaining clip 96. In an example embodiment, the retaining clip 96 is removably coupled to the second cylindrical wall 86. For example, the retaining clip 96 may be snapped over the second cylindrical wall 86. The retaining clip 96 selectively contacts a ledge 98 on the biasing member 92 to limit translation of the biasing member 92.

The biasing member 92 includes a projection 100 that contacts the valve member 94. Specifically, the projection 100 of the biasing member 92 contacts a projection 102 of the valve member 94. Similar to the biasing member 92, the valve member 94 translates along an axis parallel to the central axis 3. In an example embodiment, the valve member 94 translates along the same axis along which the biasing member 92 translates. The valve member 94 includes a shaft 104 that translates within an aperture 106 in the filtration head 20.

The valve member 94 includes a lower sealing face 108 that selectively contacts a countersink 110, a head 111 having an upper sealing face 112 that selectively contacts a countersink 114, and a flange 116 that selectively contacts a second face 118 of the filtration head 20. In an example embodiment, translation of the shaft 104 within the aperture 106 is limited by the upper sealing face 112 and the countersink 114, and at least one of contact between the lower sealing face 108 and the countersink 110 and contact between the flange 116 and the second face 118 of the filtration head 20.

The valve member 94 is operable between a first position, shown in FIG. 9, and a second position, shown in FIG. 10. The position of the valve member 94 is determined between an interaction, or lack thereof, between the biasing member 92 and the valve member 94. The biasing member 92 is configured to translate between the first position and the second positioned in response to the presence of fluid between the biasing member 92 and the first face 4a of the first flange 4.

When an amount of fluid between the biasing member 92 and the first face 4a of the first flange 4 is below a first threshold amount, the valve member 94 is in the first position. In the first position, air may pass (e.g., flow, leak, etc.) from between the filtration head 20 and the first face 4a of the first flange 4, through the opening 90, between the biasing member 92 and the first cylindrical wall 82, between the first cylindrical wall 82 and the second face 118 of the filtration head 20, between the lower sealing face 108 and the countersink 110, between the shaft 104 and the aperture 106, and between the upper sealing face 112 and the countersink 114 into the air purge 23. Also in the first position, air may, additionally or alternatively, pass from between the filtration head 20 and the first face 4a of the first flange 4, around (e.g., above, etc.) the first cylindrical wall 82, between the first cylindrical wall 82 and the second face 118 of the filtration head 20, between the lower sealing face 108 and the countersink 110, between the shaft 104 and the aperture 106, and between the upper sealing face 112 and the countersink 114. While not shown, the air passes between the upper sealing face 112 and the countersink 114 via gaps (e.g., voids, holes, channels, etc.) in at least one of the upper sealing face 112 and/or the countersink 114.

As fluid accumulates between the biasing member 92 and the first face 4a, the biasing member 92 translates towards the valve member 94. Continued collection of fluid between the biasing member 92 and the first face 4a eventually causes contact between the projection 100 of the biasing member 92 and the projection 102 of the valve member 94 which thereby causes the valve member 94 to be transitioned towards the second position. When an amount of fluid between the biasing member 92 and the first face 4a of the first flange 4 is above a second threshold amount, the valve member 94 is in the second position. In the second position, fluid is substantially blocked (e.g., prevented, impeded, etc.) from passing from the filtration head 20 into the air purge 23. Specifically, in the second position, the first cylindrical wall 82 may contact the second face 118 of the filtration head 20 and/or the lower sealing face 108 of the valve member 94 may contact the countersink 110. The flange 116 may include a sealing ring 120 positioned along an outer circumference of the flange 116. The sealing ring 120 may aid the first cylindrical wall 82 in preventing the flow of fluid into the air purge 23.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

The invention claimed is:

1. A filter cartridge comprising:
   a filter medium of cylindrical shape defining a central axis;
   a first flange, said first flange being an open flange and comprising:
   a central opening defining a filtered fluid outlet, a first face and a second face opposite to the first face, said filter medium being fixed to the second face of the first flange;
   a cylindrical extension extending from said first face along the central axis and projecting outwardly from said central opening, said cylindrical extension having an outer face and an inner face;
   characterized in that said cylindrical extension is traversed by at least one vent, and in that a first joint element is provided at a first position of the cylindrical extension and a second joint element is provided on a second position of the cylindrical extension, the first joint element being axially offset from the second joint element with respect to the central axis so that said at least one vent is positioned between the first joint element and the second joint element with respect to the central axis;
   wherein the first joint element is radially offset from the second joint element with respect to the central axis.

2. A filter cartridge according to claim 1, characterized in that said first joint element and said second joint element are selected from the group consisting of seals and molded joints.

3. A filter cartridge according to claim 1, characterized in that said first joint element is a lip seal.

4. A filter cartridge according to claim 3, characterized in that said first joint element is positioned bearing against the first face of the first flange and on the inner face wall of said cylindrical extension.

5. A filter cartridge according to claim 1, characterized in that said second joint element is a lip seal.

6. A filter cartridge according to claim 5, characterized in that said second joint element is inserted on a stop extending from said cylindrical extension.

7. A filter cartridge according to claim 1, characterized in that said vent has an air inlet and an air outlet, said air inlet being located on the outer face of said element and said air outlet being located on the inner face of said cylindrical extension the diameter of the air outlet being smaller than the diameter of the air inlet.

8. A filter cartridge according to claim 7, characterized in that the diameter of the air outlet is between 0.1 mm and 0.4 mm.

9. A filter cartridge according to claim 1, characterized in that said filter medium is impermeable to air.

10. A filter cartridge according to claim 1, characterized in that said first joint element and said second joint element form a single seal member provided with an air passage hole communicating with said vent.

11. A filter cartridge comprising:
    a filter medium of cylindrical shape defining a central axis;
    a first flange, said first flange being an open flange and comprising:
    a central opening defining a filtered fluid outlet, a first face and a second face opposite to the first face, said filter medium being fixed to the second face of the first flange;
    a cylindrical extension extending from said first face along the central axis and projecting outwardly from said central opening, said cylindrical extension having an outer face and an inner face;
    characterized in that said cylindrical extension is traversed by at least one vent, and in that a first joint element is provided at a first position of the cylindrical extension and a second joint element is provided on a second position of the cylindrical extension, the first joint element being axially offset from the second joint element with respect to the central axis so that said at least one vent is positioned between the first joint element and the second joint element with respect to the central axis;

wherein said first joint element is positioned bearing against the first face of the first flange and on the inner face wall of said cylindrical extension.

12. A filter cartridge comprising:
a filter medium of cylindrical shape defining a central axis;
a first flange, said first flange being an open flange and comprising:
a central opening defining a filtered fluid outlet, a first face and a second face opposite to the first face, said filter medium being fixed to the second face of the first flange;
a cylindrical extension extending from said first face along the central axis and projecting outwardly from said central opening, said cylindrical extension having an outer face and an inner face;
characterized in that said cylindrical extension is traversed by at least one vent, and in that a first joint element is provided at a first position of the cylindrical extension and a second joint element is provided on a second position of the cylindrical extension, the first joint element being axially offset from the second joint element with respect to the central axis so that said at least one vent is positioned between the first joint element and the second joint element with respect to the central axis;
wherein said second joint element is a lip seal and is inserted on a stop extending from said cylindrical extension.

* * * * *